No. 895,670. PATENTED AUG. 11, 1908.
E. C. OLIVER.
SPEED INDICATOR.
APPLICATION FILED JULY 8, 1907.

WITNESSES

INVENTOR
EDD C. OLIVER
HIS ATTORNEYS

UNITED STATES PATENT OFFICE.

EDD CHARLES OLIVER, OF MINNEAPOLIS, MINNESOTA.

SPEED-INDICATOR.

No. 895,670.

Specification of Letters Patent.

Patented Aug. 11, 1908.

Application filed July 8, 1907. Serial No. 382,681.

*To all whom it may concern:*

Be it known that I, EDD CHARLES OLIVER, of Minneapolis, Hennepin county, Minnesota, have invented certain new and useful Improvements in Speed-Indicators, of which the following is a specification.

The object of my invention is to provide an indicator adapted to be connected with the moving part of an automobile or other mechanism for the purpose of indicating the speed of the moving part.

The invention consists generally in a centrally pivoted weight, a spring adapted to swing on a different center and connected with said weight and means for transmitting the movement of the weight to an indicator.

Figure 1:
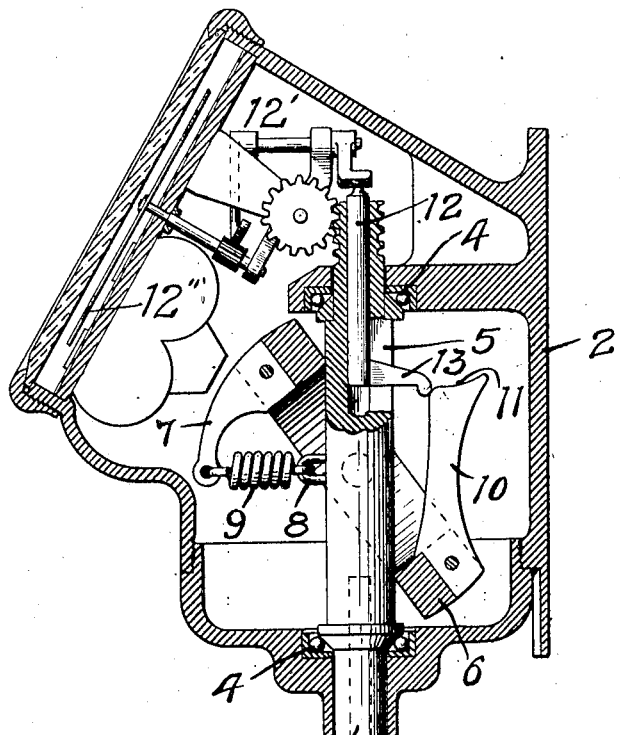
Figure 2:
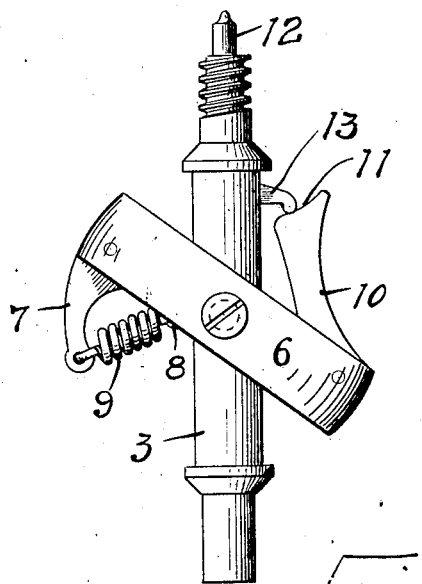

In the accompanying drawings, forming part of this specification, Figure 1 is a sectional view of a speed indicator embodying my invention. Fig. 2 is a detail perspective view showing the position assumed by the parts when the device is in operation, the inclosing casing being removed.

In the drawing, 2 represents a suitable casing wherein the operating mechanism is arranged.

3 is a vertical shaft connected by any suitable means, as a flexible shaft (not shown), with a wheel of the automobile or with the moving part of a piece of stationary machinery to which the instrument may be attached. This shaft 3 has a ball bearing 4 at each end and a longitudinal slot 5. A ring 6 is centrally pivoted on the shaft 3 and normally stands at an acute angle with respect to the longitudinal axis of the shaft. The axis of the ring coincides with the center of the shaft and the center of mass of the ring will remain at all points of its movement at the center of rotation. When the shaft 3 is revolved the ring will be moved by centrifugal force on its pivot and swing toward a horizontal position, as indicated in Fig. 2. An arm 7 is secured to the ring on one side and a staple 8 is mounted in the shaft 3 and connected with the arm 7 by a coiled spring 9. The spring 9 swings on the staple 8 as a center when the ring 4 is oscillated but its length is shorter than the radius of the ring, consequently the distance between the lower end of the arm 7 and the staple 8 varies with the movement of the ring 4 and the spring 9 will be put under tension as the ring swings down toward a horizontal position, and will be relieved as the ring returns to its normal position. The longitudinal axis of the coiled spring if extended will intersect approximately the center of the weight pivot when the weight is in its normal position. This construction enables me to obtain a more accurate zero point and a more sensitive and reliable indicator for low speeds. The tension of the spring is illustrated in Fig. 2 where the ring is shown as moved from its normal position to a point where the spring will be extended as the lower end of the arm moves away from the spring pivot.

The opposite side of the ring is provided with a standard 10 having a curved surface 11 formed on its upper end. A pin 12 is slidably arranged within the shaft 3 and has an arm 13 which projects through the slot 5 and bears on the surface 11. The movement of the pin 12 is transmitted through a mechanism 12′ to an indicator hand 12″ by means of which the speed of the machine or the moving part with which the spindle is connected, may be indicated. As the ring swings toward a horizontal position, the surface 11 will slide on the arm 13, the pin 12 moving up or down to accommodate itself to the variation in the said surface. This instrument can be adjusted very easily, will be extremely sensitive and capable of indicating accurately both high and low speeds, and being composed of but few parts can be easily assembled and will be inexpensive to manufacture.

I claim as my invention:

1. In a speed indicating device, the combination, with a rotating spindle, of a weight centrally pivoted thereon, a spring connected with said weight and arranged to swing on a different center, whereby it will be put under tension by the oscillation of said ring, the longitudinal axis of said spring intersecting approximately when extended, the pivot of said weight, when in the normal or zero position and a dial having an indicator hand and means for transmitting the movement of said ring to said hand.

2. In a speed indicating device, the combination, with a rotating spindle, of a weight centrally pivoted thereon, the center of mass of said weight being coincident with the axis of rotation, and yielding means connected with said ring and arranged to swing therewith but on a different center and put under tension by the movement of said ring, the axis of said yielding means when extended intersecting approximately the pivot of said weight, when the device is in its inoperative position, a dial and an indicator hand therefor and a motion transmitting device connecting said ring with said indicator hand.

3. A speed indicating device comprising a rotating spindle, a weight centrally pivoted thereon, a coiled spring connected at one end to said spindle and at its other end to said weight, the longitudinal axis of said spring intersecting approximately when extended, the pivot of said weight when the device is in its inoperative position and said spring swinging on a shorter radius than said weight, whereby it will be put under tension when said weight moves toward a horizontal position, a dial and indicator hand therefor, and means for transmitting the movement of said weight to said hand.

4. An indicating device comprising a rotating spindle, a ring centrally pivoted thereon, a coiled spring attached at one end to said spindle, an arm mounted on said ring and connected to the other end of said spring, the longitudinal axis of said spring coinciding approximately with the center of the pivot of said weight when the device is in its inoperative position and the radius of said ring being greater than the length of said spring, whereby the oscillation of said ring toward a horizontal position will put said spring under tension, a dial and indicator hand therefor, and means for transmitting the movement of said ring to said hand.

5. A speed indicating device comprising a rotating spindle, an oscillating weight centrally pivoted thereon, a spring device arranged to be put under tension by the movement of said weight toward a horizontal position, a standard mounted on said weight and having a curved end surface and a pin slidably mounted in said spindle and having an arm adapted to bear on said surface, an indicator hand and dial and means actuated by the movement of said pin for operating said hand.

In witness whereof, I have hereunto set my hand this 2nd day of July 1907.

EDD CHARLES OLIVER.

Witnesses:
J. B. ERA,
RICHARD PAUL.